(12) United States Patent
Miller

(10) Patent No.: US 8,568,511 B2
(45) Date of Patent: *Oct. 29, 2013

(54) GAS STORAGE AND RELEASE USING PIEZOELECTRIC MATERIALS

(75) Inventor: Seth Adrian Miller, Englewood, CO (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,841

(22) Filed: Jun. 11, 2012

(65) Prior Publication Data

US 2012/0247333 A1    Oct. 4, 2012

Related U.S. Application Data

(62) Division of application No. 12/488,200, filed on Jun. 19, 2009, now Pat. No. 8,197,579.

(51) Int. Cl.
*B03C 3/155*    (2006.01)

(52) U.S. Cl.
USPC ............ 95/61; 95/68; 95/116; 95/139; 96/68; 96/69; 96/122; 96/130; 96/143; 96/153; 96/154

(58) Field of Classification Search
USPC ............ 95/61, 68, 116, 128, 131, 139; 96/66, 96/68, 69, 122, 130, 143, 153, 154; 429/410–412; 60/275, 311
See application file for complete search history.

(56) References Cited

U.S. PATENT DOCUMENTS

| | | | |
|---|---|---|---|
| 4,406,672 A | 9/1983 | Berz | |
| 4,654,054 A | 3/1987 | Snaddon et al. | |
| 4,877,506 A | 10/1989 | Fee et al. | |
| 5,288,306 A * | 2/1994 | Aibe et al. | 95/141 |
| 5,474,600 A | 12/1995 | Volodina et al. | |
| 5,667,564 A * | 9/1997 | Weinberg | 96/58 |
| 6,749,669 B1 | 6/2004 | Griffiths et al. | |
| 6,833,024 B2 * | 12/2004 | Holst et al. | 96/108 |
| 7,510,600 B2 | 3/2009 | Ibe et al. | |
| 8,123,834 B2 * | 2/2012 | Masel et al. | 95/90 |
| 8,197,579 B2 * | 6/2012 | Miller | 96/68 |
| 8,241,396 B2 * | 8/2012 | Ursem et al. | 95/59 |
| 2003/0154865 A1 * | 8/2003 | Zornes | 96/143 |
| 2006/0191409 A1 | 8/2006 | Fan et al. | |
| 2006/0272504 A1 | 12/2006 | Nutsos | |
| 2009/0011312 A1 | 1/2009 | Son | |
| 2009/0186258 A1 | 7/2009 | Makita et al. | |
| 2010/0043633 A1 * | 2/2010 | Galbraith | 95/68 |
| 2010/0322837 A1 * | 12/2010 | Miller | 423/293 |

FOREIGN PATENT DOCUMENTS

JP    56130208 A    10/1981

OTHER PUBLICATIONS

Da-Wei Fu, Heng-Yun Ye, Qiong Ye, Ke-Ji Pan, Ren-Gen Xiong, Ferroelectric Metal-Organic Coordination Polymer with a High Dielectric Constant, Dalton Transactions, 2008, pp. 847-877, DOI: 10.1039/b714293e, RCS Publishing, USA.

(Continued)

*Primary Examiner* — Richard L Chiesa
(74) *Attorney, Agent, or Firm* — Turk IP Law, LLC

(57) ABSTRACT

Embodiments are described that generally relate to the storage and release of a gas using piezoelectric materials.

15 Claims, 4 Drawing Sheets

(56) References Cited

OTHER PUBLICATIONS

Da-Wei Fu, Wen Zhang, Ren-Gen Xiong, The First Metal-Organic Framework (MOF) of Imazethapyr and its SHG, Piezoelectric and Ferroelectric Properties, Dalton Transactions, 2008, pp. 3946-3948, DOI: 10.1039/b806255b, RCS Publishing, USA.

Qiong Ye, Da-Wei Fu, Hang Tian, Ren-Gen Xiong, Phillip Wai Hong Chan, Songping D. Huang, Multiferroic Homochiral Metal-Organic Framework, Inorganic Chemistry, Jan. 4, 2008, pp. 772-774, DOI: 10.1021/ic701828w, ACS Publications, Washington, DC, USA.

Yun Liu, Houria Kabbour, Craig M. Brown, Dan A. Neumann, Channing C. Ahn, Increasing the Density of Adsorbed Hydrogen and Coordinatively Unsaturated Metal Centers in Metal-Organic Frameworks, Langmuir, Mar. 27, 2008, pp. 4772-4777, DOI: 10.1021/la703864a, ACS Publications, Washington, DC, USA.

Basolite Metal Organic Frameworks—The World Record in Surface Area, BASF Future Business, www.basf-futurebusiness.com/en/projects/gas-storage.html, accessed Jun. 18, 2009.

Basolite Metal Organic Frameworks—The World Record in Surface Area Datasheet, http://www.basf-futurebusiness.com/fileadmin/user_upload/Projekte/MOF/BASF_Basolite_datasheet_061108_v2.pdf, accessed Jun. 18, 2009.

\* cited by examiner

GAS STORAGE AND RELEASE USING PIEZOELECTRIC MATERIALS

CROSS-REFERENCE TO RELATED APPLICATION

This application is a divisional of and claims priority to U.S. patent application Ser. No. 12/488,200 filed Jun. 19, 2009 entitled "Gas Storage and Release Using Piezoelectric Materials" now U.S. Pat. No. 8,197,579 and issued on Jun. 12, 2012, the entire contents of which are incorporated herein by reference.

BACKGROUND

Information

Gas storage and release may be desirable in a variety of applications, such as fuel cells, materials or semiconductor processing or micro-electro-mechanical systems, for example. In some instances, it may be necessary to release gases quickly, accurately or at a high pressure. Current methods for storing and releasing gases may be difficult, energy intensive, or uneconomical for some applications.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
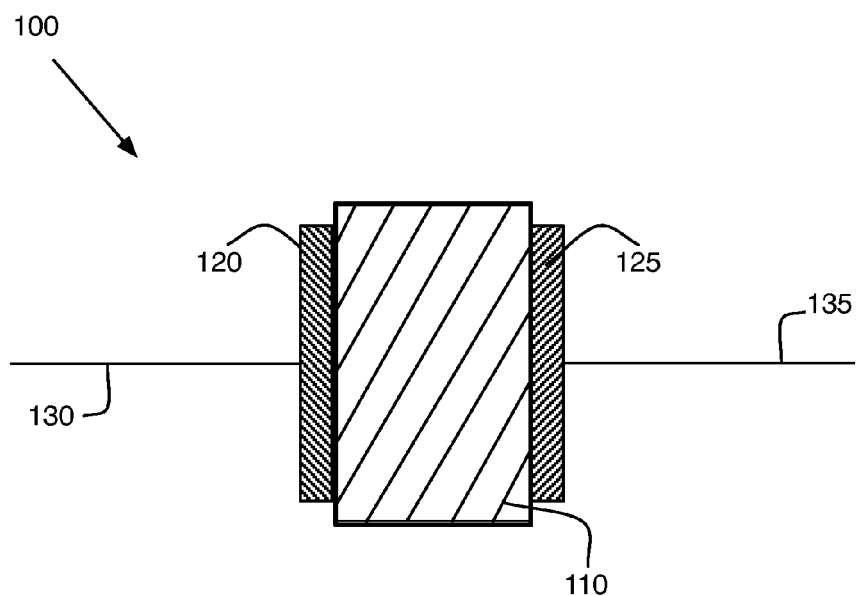
FIG. 1 illustrates an example device for storing and releasing a gas.

The following description sets forth various examples along with specific details to provide a thorough understanding of claimed subject matter. It will be understood by those skilled in the art, however, that the claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and make part of this disclosure.

This disclosure is drawn, inter alia, to methods, apparatus, and systems related to gas storage and release using piezoelectric metal-organic framework materials.

In a variety of applications, it may be necessary to store and supply a gas. For example, the storage and release of hydrogen or other fuels or gases may be an important aspect of fuel cell applications or fuel delivery applications in a wide variety of implementations such as, for example, automobiles, hand held devices (such as cell phones, gaming devices or personal digital assistants), laptop computers or industrial applications. In other examples, the delivery of a gas at substantially precise pressure or volume may be important for materials processing, chemicals processing or semiconductor processing. In some examples, the delivery of a substantially precise pressure using a gas may be important for a variety of implementations, such as, for example, pneumatics systems, motion devices, measurement devices or micro-electro-mechanical system implementations.

In various embodiments, a gas may be provided for storage and release. In some embodiments, a piezoelectric metal-organic framework (MOF) material may be provided for storage and release of the gas. In some examples, the piezoelectric metal-organic framework material may be characterized as a non-centrosymmetric metal-organic framework. In some examples, the piezoelectric metal-organic framework material may respond to an applied electric field with a net stress throughout the material that may at least partially change its size, shape or geometry such that at different electric field strengths, the material may have different gas sorption characteristics. In an example, the piezoelectric metal-organic framework material may readily adsorb the gas with no applied electric field, such that the material may be substantially adsorptive in its relaxed state. In such examples, an applied electric field may substantially release the adsorbed gas. In some examples, the release of the stored gas may be responsive to the magnitude of the applied electric fields such that an electric field with a greater magnitude causes more gas to be released. Such systems may allow for the accurate modulation of an applied pressure or an amount of released gas based at least in part on a variation in electric field strength, which may be controlled to a substantially precise degree.

In other examples, the piezoelectric metal-organic framework material may adsorb a gas with an applied electric field and may release the gas when the electric field is removed or the field strength is lowered. In some examples, the piezoelectric metal-organic framework material may selectively adsorb a gas based at least in part on the magnitude of the applied electric field such that one type of gas is adsorbed at one field strength and another type of gas is adsorbed at another field strength.

In some embodiments, the piezoelectric metal-organic framework material may be provided in a storage and release unit that may include electrodes for applying an electric field to the material. The material may be provided in a vessel that may include a gas port. The gas port may lead, by piping, for example, to an optional control valve. The electrodes may be coupled by connectors to a power supply which may be coupled to a controller. The power supply, under direction of the controller, may provide power to produce the electric field to store and release the gas. The storage, release and control of the gas may be configured for a variety of implementations. The units and corresponding piezoelectric metal-organic framework material(s) may be configured in a variety of ways, such as a relatively thin sheet of material sandwiched between electrodes, a rolled sheet of material and electrodes, a block of material coupled to electrodes, or the like.

In various examples, any number of storage and release units may be provided. The units may be independently controlled or they may be controlled together. In some examples, the outputs from the units may be combined through a manifold such that several units may provide a single gas output port. Such implementations may provide for larger gas outputs while providing relatively thin or small piezoelectric metal-organic framework material units that may be controllable at lower voltages, for example. In some examples, the units may be in parallel electrically. In other examples, the units may be in series electrically. In some examples, the units may share electrodes with adjacent units. The units may be provided or implemented in a wide variety of configurations based at least in part on application parameters, such as, for example, the volume or pressure of gas to be provided or the necessary precision of the gas delivery system.

FIG. 1 illustrates an example device for storing and releasing a gas arranged in accordance with at least some embodiments of the present disclosure. As illustrated in FIG. 1, a gas storage and release device 100 may include one or more piezoelectric metal-organic framework material 110, an electrode 120 and/or an electrode 125. Gas storage and release device 100 may also include a connector 130 and a connector 135, which may be coupled to a power supply, which is not shown in FIG. 1 for the sake of clarity.

A gas may be introduced to piezoelectric metal-organic framework material 110 in any suitable manner. In some examples, gas storage and release device 100 may be introduced to a volume or an enclosed container containing a gas to be stored in the gas storage and release device or to be removed from the volume or container. In other examples, device 100 may be in a volume or vessel and a gas may be piped or pumped into the volume for storage.

The gas or gases to be stored may include any suitable gas, such as, for example, hydrogen ($H_2$), carbon dioxide ($CO_2$), ammonia ($NH_3$), boron trifluoride ($BF_3$), aluminum trifluoride ($AlF_3$), or the like. The piezoelectric metal-organic framework material may be chosen based at least in part on the gas or mixture of gases to be adsorbed.

In some examples, piezoelectric metal-organic framework material 110 may store gas with little or no electric field applied to piezoelectric metal-organic framework material 110. In such examples, the gas may be released when an electric field is applied to the piezoelectric metal-organic framework material. A piezoelectric metal-organic framework material with little or no electric field applied to it may be characterized as being in a relaxed state. In other examples, a gas may be stored while an electric field is applied and the gas may be released when some or all of the electric field may be released from the piezoelectric metal-organic framework material.

In some examples, based at least in part on the geometry of the metal-organic framework, a large amount of adsorptive surface area may be provided in a relatively small volume. For example, the piezoelectric metal-organic framework material may have a substantially porous structure or structures that may provide substantial gas storage capacity in a relatively small volume. In some examples, the ratio of the volume of stored gas at about standard temperature and pressure to the volume of the metal-organic framework used to store that volume of gas may be in the range of about one-hundred (100) to about one thousand two-hundred (1200) or more. In some examples, the piezoelectric metal-organic framework material may provide for six (6) or more weight percent storage of hydrogen (on a materials basis). In some examples, the piezoelectric metal-organic framework material may change its geometry by about one percent under an applied electric field. In some examples, the piezoelectric metal-organic framework material may provide gas storage at relative low pressures. In some example, the piezoelectric metal-organic framework material may provide gas storage at about room temperature and/or pressure. In other examples, the gas may be stored at a pressure and/or temperature above room temperature and pressure.

Piezoelectric metal-organic framework material 110 may include any material or combination of materials that may change its gas adsorption properties in response to an applied electric field. The piezoelectric metal-organic framework material may be constructed from a diverse set of building blocks and, in some examples, the final material may be constructed to include various functionalities and characteristics, such as, gas sorption, gas selectivity, piezoelectric properties, density properties, weight properties, or the like. In some examples, the electric field may change the shape, size or geometry of the piezoelectric metal-organic framework material such that the material may store or release a gas.

Piezoelectric metal-organic framework material 110 may include any suitable material that may store and/or release a gas in response to an electric field. In some examples, piezoelectric metal-organic framework materials may include metal ions or clusters and organic molecules formed in a crystalline structure. In various examples, piezoelectric metal-organic framework material 110 may be characterized as a non-centrosymmetric material. In some examples, the piezoelectric metal-organic framework material may include a porous crystalline material, such as, for example, MOF-177, MOF-74 or a MOF-74 framework structure with open $Zn^{2+}$ sites. In other examples, the piezoelectric metal-organic framework material may include a metal-organic framework with coordinately unsaturated metal centers. In other examples, the piezoelectric metal-organic framework material may include a 2D laminar multiferroic metal-organic framework, such as, for example, a 2D laminar homochiral metal-organic framework. In various examples, the 2D laminar homochiral metal-organic framework may be any metal-organic framework having the chemical formula $(Lig)_2Tb(H_2O)_2(ClO_4)$, such that Lig represents any suitable ligand, such as, for example, any homochiral ligand, a lactate ligand, oxalic acid, malonic acid, succinic acid, glutaric acid, phthalic acid, isophthalic acid, terephthalic acid, citric acid, trimesic acid, 1,2,3-triazole, pyrrodiazole, squaric acid or the like. In other examples, the piezoelectric metal-organic framework material may include a diamond-like metal-organic framework such as, for example, $Cd(Imazethapyr)_2$, which may be crystallized in a non-centrosymmetric space group. In other examples, the piezoelectric metal-organic framework material may include any homochiral metal-organic framework such as, for example, (cyanobenzyl quinidinium)$Cu^I_3(CN)_2Br$, (cyanobenzyl cinchonidinium)$Cu^I_{2.5}(CN)_2Br_{1.5}$ or the like.

Any volume of piezoelectric metal-organic framework material provided may be provided based at least in part on the amount and/or pressure of gas to be stored and/or supplied and the adsorption capacity of the piezoelectric metal-organic framework material. In some examples the volume may be in the range of about one (1) to one-hundred (100) cubic microns. In other examples, the volume may be in the range of about one-hundred (100) cubic microns to one (1) cubic centimeter. In other examples, volumes in the range of one (1) cubic centimeter to ten (10) liters may be provided. In an example, a volume of about ten (10) to eighty (80) liters may be provided.

As shown, piezoelectric metal-organic framework material 110 may be sandwiched between electrodes 120, 125. The thickness of piezoelectric metal-organic framework material 110 may be any suitable thickness and, in some examples, may be in the range of about one (1) micron to about twenty (20) centimeters, or more. In some examples, the thickness may be in the range of about ten (10) microns to about one-hundred (100) microns. In some examples, the thickness may be in the range of about one-hundred (100) microns to about one (1) centimeter. In other examples, the thickness may be in the range of about one (1) centimeter to about ten (10) centimeters. As will be discussed further below, a variety of configurations may be available for the piezoelectric metal-organic framework material and the electrodes, and gas storage and release units may be provided in a variety of configurations depending on the gas storage and delivery implementation.

Electrodes 120, 125 may include any suitable conductive material or materials. In some examples, the electrodes may include metals such as, for example, aluminum (Al), copper (Cu), or the like. The electrodes may be electrically coupled to the piezoelectric metal-organic framework material in any manner such that they may apply an electric field to the piezoelectric metal-organic framework material. In some examples, the electric coupling may include the electrodes being substantially in contact with the piezoelectric metal-organic framework material. In other examples, the electric coupling may include the electrodes being adjacent to, but not in direct physical contact with, the piezoelectric metal-organic framework material. In some examples, the electric coupling may include another material or materials between the electrode and the piezoelectric metal-organic framework material.

As shown in FIG. 1, in some examples, the electrodes may be provided along a portion of the sides of the piezoelectric metal-organic framework material and the electrodes may be about the same size and thickness. However, one of ordinary skill in the art, in light of the present disclosure, will recognize that a variety of other configurations may be used without departing from the spirit or scope of the claimed subject matter. In some examples, the electrodes may run along an entire length of the sides of a piezoelectric metal-organic framework material. In some examples, the electrodes may be different sizes, thicknesses and/or materials. As shown, in some examples, two electrodes may be provided. In other examples, additional electrodes may be provided. In some examples, the piezoelectric metal-organic framework material may be sandwiched between electrodes and the layers may be in a spiral shape. In other examples, multiple layers of piezoelectric metal-organic framework materials may be layered between multiple electrodes.

In some examples, the electrodes may be gas permeable. Gas permeable electrodes may include any suitable gas permeable material(s) and/or configuration. In some examples, the gas permeable electrodes may include holes to allow gas permeation. In other examples, the chosen materials may be permeable to the gas being stored. In some examples, the electrodes may be substantially thin such that they allow gas permeation. In some examples, gas permeable electrodes may be arranged to provide additional surface area for the storage and release of the stored gas. In other examples, the piezoelectric metal-organic framework material may be substantially encapsulated by the electrodes and/or other encapsulating material(s) such that gas permeable electrodes are configured to provide for the storage and release of the gas.

As discussed, gas storage and release device 100 may be introduced to a gas for adsorption in any suitable manner. In some examples, gas storage and release device 100 may be portable and may provide for flexibility such that the device may be easily placed in and/or removed from a container. For example, gas storage and release device 100 may be introduced to a tank of gas to adsorb the gas and may then be removed from the tank. The device may then be used to transport the gas, for example. In some examples, a device may be adapted to provide for the removal of gas from a volume and may allow for the gas to be disposed of at another site. Gas storage and release device 100 may also be introduced to a container or site for release of the gas in any suitable manner. For example, gas storage and release device 100 may be added to a container or vessel where gas release is desired or it may be attached to a device for the release of a gas.

As discussed, gas storage and release device 100 may include connector 130 and connector 135, which may be adapted to electrically couple or connect gas storage and release unit 110 to a power supply. The power supply may apply a voltage to the electrodes, as is discussed further below. The connectors may be provided in a variety of configurations such as, for example, discrete wires or conductive traces on a substrate or circuit board. In some examples, the gas storage and release device may be provided in a vessel for controlling the release of the gas and for connection to a device for release in various implementations.

In some examples, piezoelectric metal-organic framework material 110 and electrodes 120, 125 may be provided in or on a substrate. In some examples, the piezoelectric metal-organic framework material and electrodes may be provided as a solid state device. In some examples, connectors 130, 135 may be provided as conductive traces in or on the substrate and a discrete device or unit may be provided. In some examples, the device may be provided as a board level component. In some examples, connections to connectors 130, 135 may be made through pin connections.

In various examples, multiple piezoelectric metal-organic framework material and electrode units may be provided. In such examples, multiple connectors may also be provided. In some examples, the units may be coupled in series electrically. In other examples, the units may be coupled in parallel electrically. In some examples, the units may have independent connections to a power supply such that the units may be operated independently.

Figure 2:
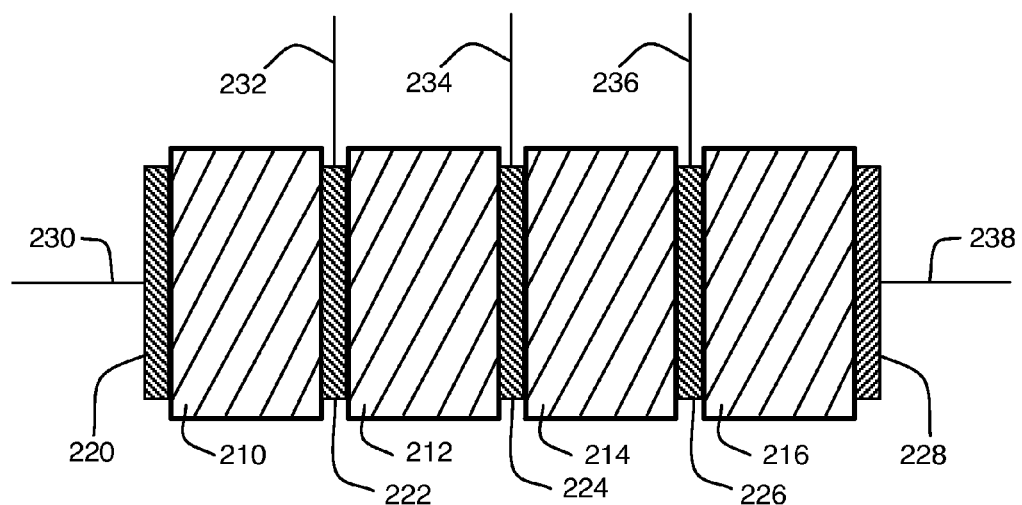
FIG. 2 illustrates an example device for storing and releasing a gas.

FIG. 2 illustrates an example device for storing and releasing a gas arranged in accordance with at least some embodiments of the present disclosure. Piezoelectric metal-organic framework material portions may be adapted to share electrodes.

Piezoelectric metal-organic framework materials 230, 232, 234, 236 may include any of the materials discussed above with reference to FIG. 1. In some examples, the piezoelectric metal-organic framework materials may be the same. In other examples, some or all piezoelectric metal-organic framework materials may be different. As shown, electrodes 222, 224, and 226 may be shared electrodes. Such a configuration may allow for fewer electrode connections and fewer connectors. The connectors 260, 262, 264, 266, and 268 may include any of the materials or configurations as discussed with reference to FIG. 1. The connectors may be connected to a power supply that may provide voltages such that electric fields are provided to the piezoelectric metal-organic framework materials. In some examples, the supplied voltages may be the same while in other examples, they may be different. In some examples, multiple connectors may be combined into a single wire or trace before reaching the powers supply. In some examples, gases may be provided from the piezoelectric metal-organic framework materials simultaneously. In other examples, gases may be provided from the piezoelectric metal-organic framework materials independently. In an example, gas from one piezoelectric metal-organic framework material may be exhausted and each piezoelectric metal-organic framework material may be exhausted until the device is exhausted.

Figure 3:
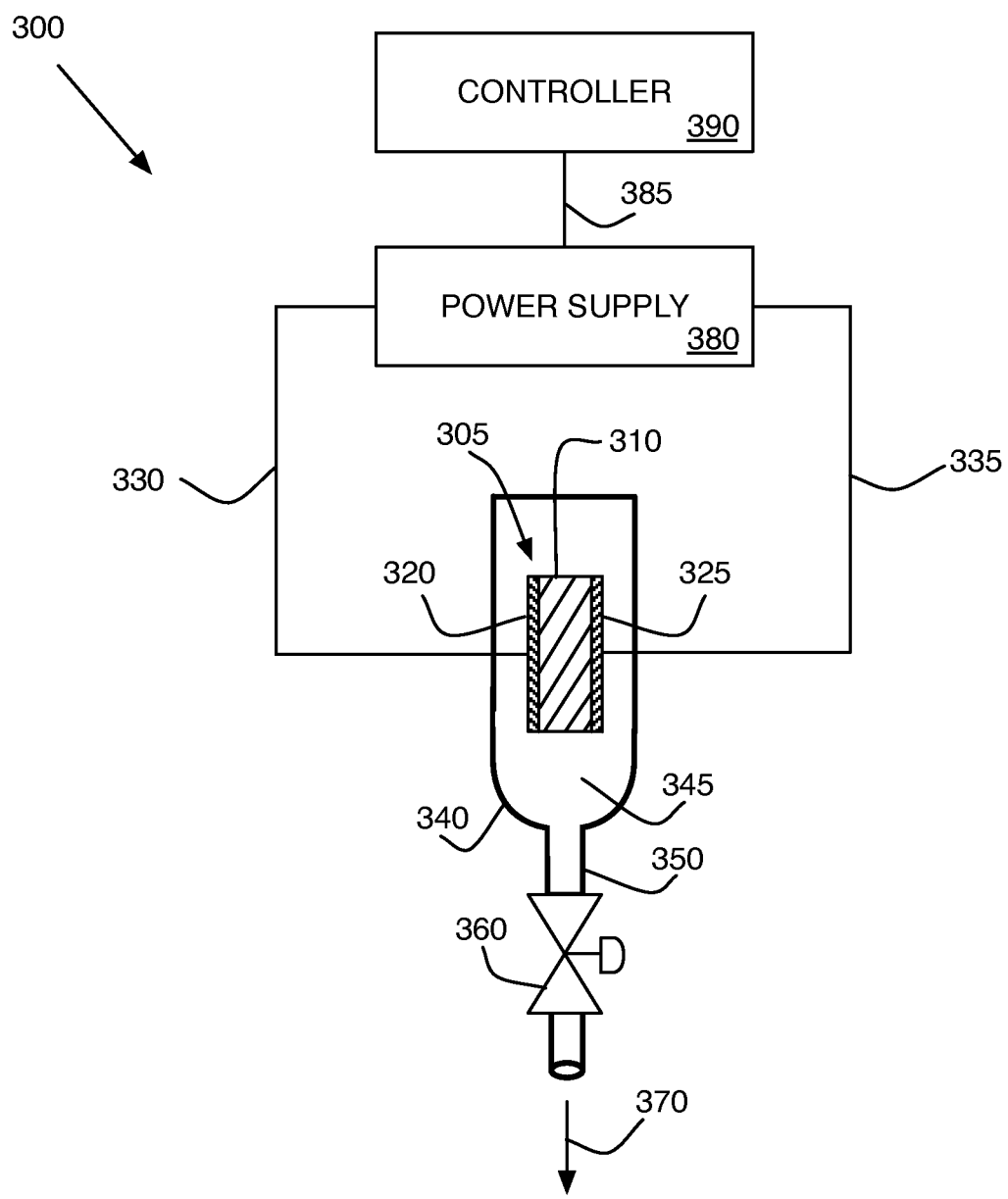
FIG. 3 illustrates an example system for storing and releasing a gas.

FIG. 3 illustrates an example system for storing and releasing a gas arranged in accordance with at least some embodiments of the present disclosure. As illustrated in FIG. 3, a gas storage and release system 300 may include a gas storage and release unit 305. Gas storage and release unit 305 may include one or more of a piezoelectric metal-organic framework material 310, an electrode 320 and/or an electrode 325. Gas storage and release unit 305 may be provided in a vessel 340 having a port 350. Port 350 may provide for the introduction and release of a gas to piezoelectric metal-organic framework material 310. Port 350 may be coupled to a section of pipe and a valve 360. Another portion of pipe may lead from valve 360 in a direction of gas delivery 370. A void 345 may be provided for expansion of metal-organic framework material 310 and/or for preloading pressure to valve 360. Gas storage and release system 300 may also include a connector 330 and a connector 335, which may be electrically coupled to a power supply 380. An optional controller 390 may be coupled to power supply 380 by a connector 385.

Vessel 340 may include any suitable material for storing a gas. In some examples, vessel 340 may be provided as a stand alone unit. Electrodes 320, 325 may be a part of the vessel or attached either internally or externally to the vessel in any manner that may provide an electrical coupling to piezoelectric metal-organic framework material 310 such that an electric field may be applied to the piezoelectric metal-organic framework material. The other components may be provided as discrete components, including, for example, couplers 330, 335 being wires and power supply 380 and optional controller 390 being discrete devices.

In other examples, vessel 340 may be attached to a mounting substrate or it may be formed in a substrate as a part of a micro-electro-mechanical system. In such examples, electrodes 320, 325 may be formed on the substrate and coupled either internally or externally to the vessel in any manner that may provide an electrical coupling to piezoelectric metal-organic framework material 310 such that an electric field may be applied to the piezoelectric metal-organic framework material. The other components may be provided in any suitable manner. In some examples, connectors 330, 335 may be discrete wires or traces on a substrate or circuit board. In some examples, vessel 340 and port 350 may be structures formed in or on the substrate. Valve 360 may be provided in or on the substrate or it may be provided as an external device separate from the substrate and connectable by port 350. Power supply 380 and optional controller 390 may also be provided integral to the substrate or as discrete components. In some examples, gas storage and release unit 305 may be provided as a board level device and connections may be made to it using pin connections. In an example, the unit may provide for a micro fuel cell unit for providing fuel to a variety of components.

A gas may be introduced to piezoelectric metal-organic framework material 310 in any suitable manner, such as, for example, through port 350 by opening valve 360. The gas to be stored and/or released may include any gas discussed herein. The piezoelectric metal-organic framework material may be chosen based at least in part on the gas or mixture of gases to be adsorbed and may include any material or materials herein.

As discussed, gas storage and release system 300 may include connector 330 and connector 335, which may electrically couple to power supply 380. The connectors may be provided in a variety of configurations such as, for example, discrete wires or conductive traces on a substrate or circuit board.

Power supply 380 may include any suitable power supply module that may supply power to apply an electric field to the piezoelectric metal-organic framework material via, for example, connectors 330, 335 and electrodes 320, 325. In various examples, the power supply may include a constant voltage source or a constant current source. In some examples, the power supply may be adapted to provide substantially any voltage and/or current within a particular range or ranges of values such that the electric field may be modulated. The voltage supplied may be based at least in part on system parameters such as, for example, the gas stored and released, the type of piezoelectric metal-organic framework material, the size and thickness of the piezoelectric metal-organic framework material or the like. In various examples, the supplied voltage(s) may be in the range of about one (1) volt to about ten (10) kilovolts or more. In an example, the power supply may be adapted to operate in response to signals from controller 390.

Controller 390 may be any device that may control power supply 380. In some examples, controller 390 may include one or more of a processor, a memory, input/output devices, display devices and/or related circuitry. In some examples, controller 390 may be provided as a computer or workstation. In other examples, controller 380 may be provided as a dedicated integrated circuit. Controller 390 may be connected to other devices (not shown) that may be adapted to provide data to controller 390, such as, for example, feedback, system requests, ambient parameters or the like. In some examples, controller 390 may be connected to output devices, such as, for example, memory devices, printers, monitors, or the like, such that data may be collected or monitored.

As shown in FIG. 3, a single gas storage and release unit may be provided in a single vessel. In other examples, multiple gas storage and release units may be provided in a single vessel. In some examples, multiple vessels may be provided with each having a single or multiple gas storage and release unit. In other examples, multiple vessels may be provided with different numbers of gas storage and release units. In various examples, about two (2) to about ten (10) vessels may be provided. In other examples, hundreds or more vessels may be provided. In some examples, the piezoelectric metal-organic framework materials may be the same in each vessel. In other examples, the piezoelectric metal-organic framework materials may be different. In some examples, multiple vessels may be provided that may be configured with a manifold to combine their outputs to a single output. In other examples, multiple manifolds may be provided. The multiple gas storage and release units may be provided in any manner as discussed above, such as, for example, electrically in series, electrically in parallel, or configured with shared electrodes as described with reference to FIG. 2.

In some examples with multiple vessels, the power supply may be arranged to provide the same voltages to each of the piezoelectric metal-organic framework materials. In other examples, the supplied voltages may be different. In some examples, gases may be provided from the vessels simultaneously. In other examples, gases may be provided from the vessels independently. Such control of gas delivery from the vessels may be effected by controller 390 and power supply 380 causing electric fields to various vessels. In an example, gas from one vessel may be exhausted and the system may sequentially move to other vessels until the system is exhausted.

Figure 4:
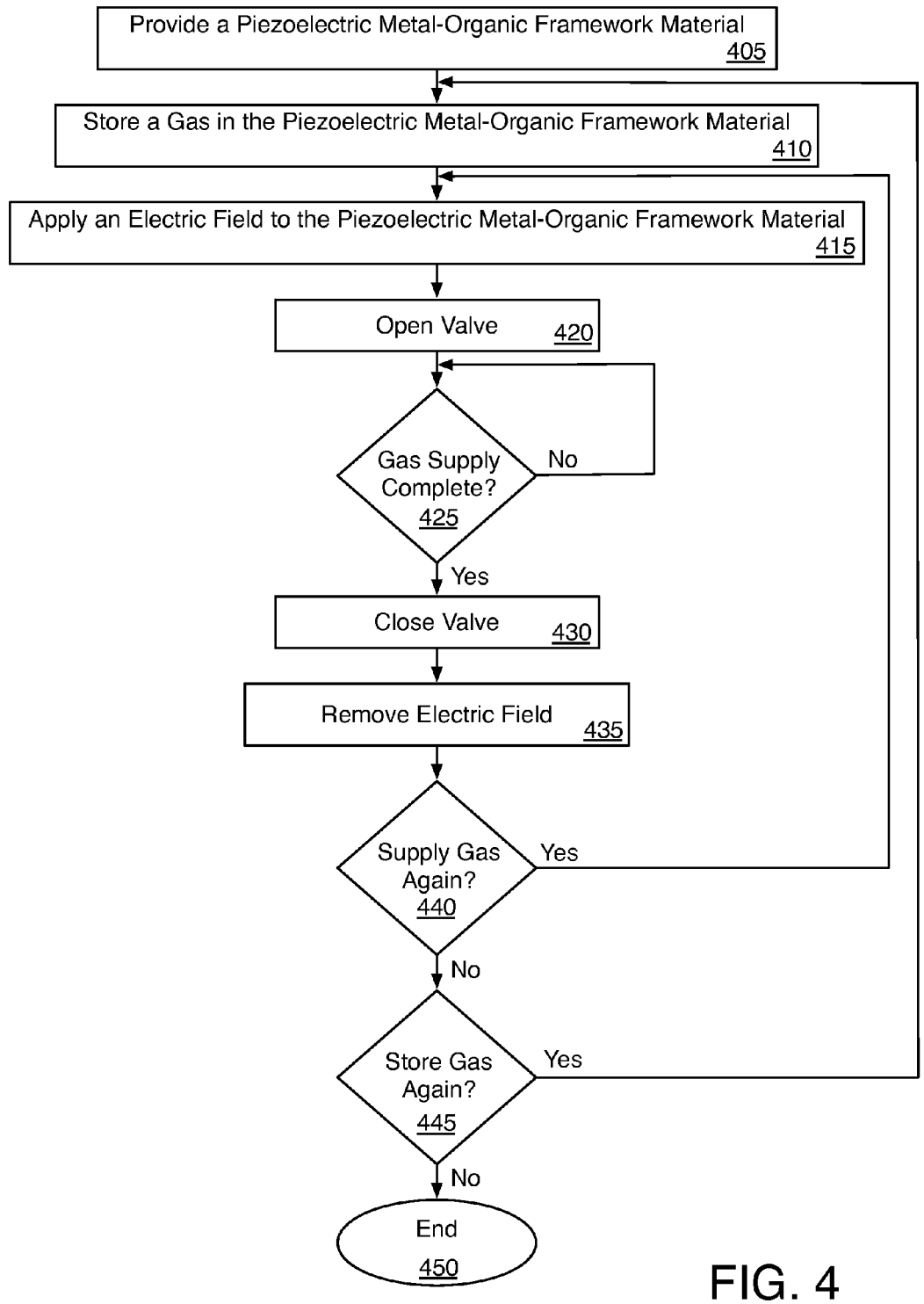
FIG. 4 illustrates a flowchart of an example method for storing and releasing a gas.

FIG. 4 illustrates a flow chart of an example method 400 for storing and releasing gas in accordance with at least some embodiments of the present disclosure. Method 400 may include one or more functional operations as illustrated by blocks 405, 410, 415, 420, 425, 430, 435, 440, 445, and/or 450.

At block 405, a piezoelectric metal-organic framework material may be provided. Any of the piezoelectric metal-organic framework material(s) as discussed above in any configuration and/or system as discussed above may be provided. Processing may continue from block 405 to block 410.

At block 410, a gas may be stored in the piezoelectric metal-organic framework material. Any gas as discussed above may be stored in any manner as discussed. For example, a gas may be provided by opening a valve and providing the gas into a vessel having the piezoelectric metal-organic framework material. In an example, the gas may be adsorbed without the application of an electric field to the piezoelectric metal-organic framework material. Processing may continue from block 410 to block 415.

At block 415, an electric field may be applied to the piezoelectric metal-organic framework material (and the stored gas) in any manner as discussed above. The electric field may induce or trigger the release of at least a portion of the gas and may pressurize a vessel and/or a valve. Processing may continue from block 415 to block 420.

At block 420, the valve may be opened to release the gas. As shown, the electric field may be provided prior to the valve opening such that the gas may be pressurized or pre-pressurized. In other examples, the valve may be opened and the electric field may be applied substantially simultaneously. In other examples, the valve may be opened prior to providing the electric field. In other examples, no valve may be provided and the electric field may release the gas. Processing may continue from block 420 to block 425.

At block 425, method 400 may be arranged to determine whether the gas supply or release is complete. In some examples, the determination may be made based on feedback, for example, from the system or unit receiving the gas. In other examples, the determination may be based without feedback and it may be made on, for example, an elapsed amount of time or a predetermined pressure drop or the like. In any event, if the supply of gas is not complete, the valve may remain open and the electric field application may continue, and the method may continuously or periodically return to decision block 425. Processing may remain at block 425 until the gas supply is complete. Processing may continued from block 425 to block 430 when the supply of gas is complete.

At block 430 the valve (if used) may be closed. Processing may continue from block 430 to block 435.

At block 435, the electric field may be removed. Upon removal of the electric field, at least a portion any remaining gas may be adsorbed into the piezoelectric metal-organic framework material. Processing may continue from block 435 to block 440.

At block 440, the method 400 may be arranged to determine whether additional gas is to be released. In some examples, the determination may be based on feedback from another system or unit. In other examples, the determination may be based on a predetermined parameter, such as a volume of gas to be released, a counter value that stores the number of times gas has been released or the like. If additional gas is to be supplied or released, the method may proceed from block 440 to block 415 and the method may be repeated. If no additional gas is to be supplied, then the method may proceed from block 440 to block 445.

At block 445 the method 400 may determine whether additional gas is to be stored (for example, to recharge the system for additional gas release or supply). If additional gas is to be stored, then the method may proceed from block 445 to block 410. If additional gas is not to be stored, then the method may proceed from block 445 to block 450, where the process may terminate.

Figure 5:
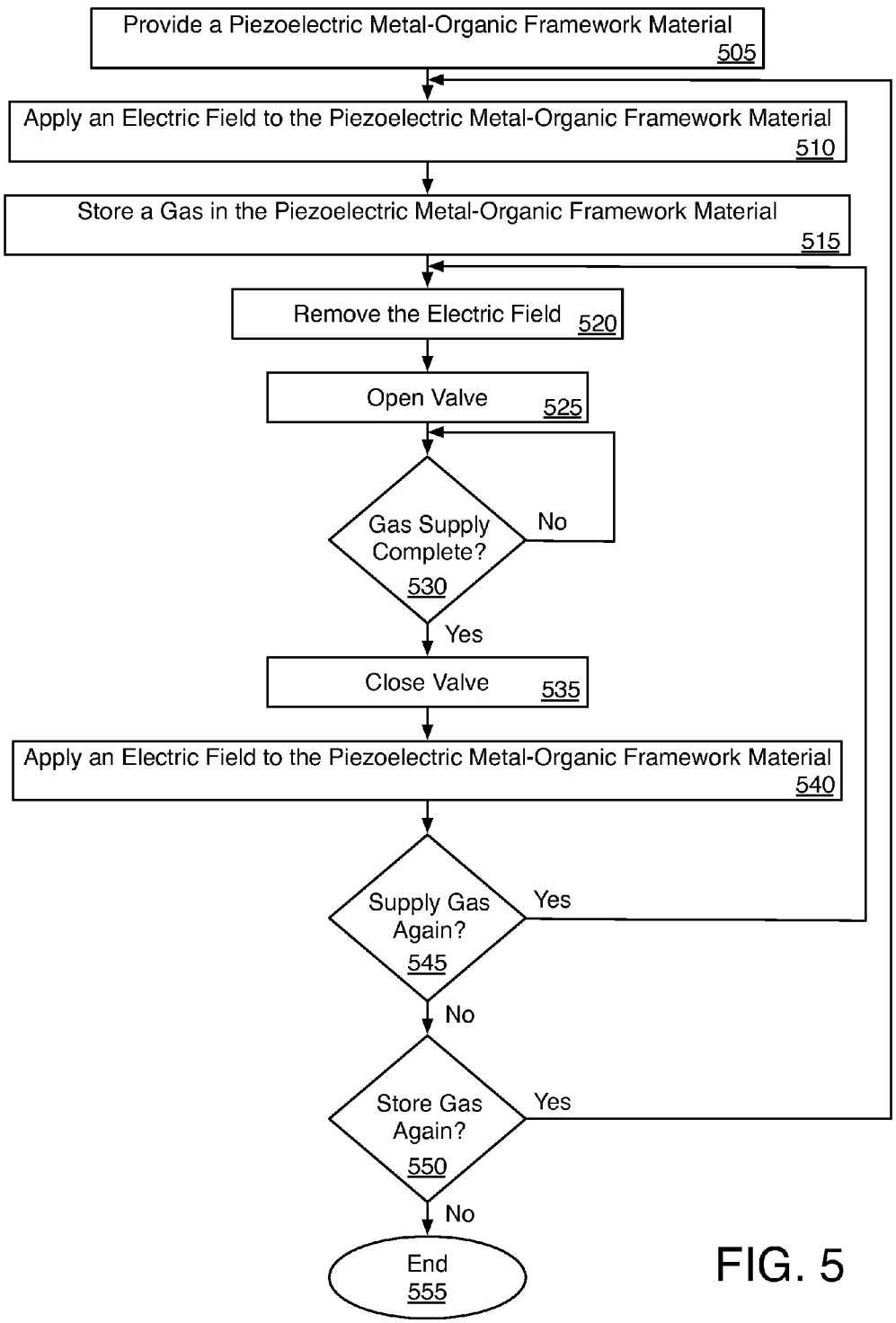
FIG. 5 illustrates a flowchart of an example method for storing and releasing a gas, all arranged in accordance with at least some embodiments of the present disclosure.

FIG. 5 illustrates a flowchart of an example method 500 for storing and releasing a gas in accordance with at least some embodiments of the present disclosure. Method 500 may include one or more functional operations as illustrated by blocks 505, 510, 515, 520, 525, 530, 535, 540, 545, 550 and/or 555.

At block 505, a piezoelectric metal-organic framework material may be provided. Any of the piezoelectric metal-organic framework material(s) as discussed above in any configuration and/or system as discussed above may be provided. Processing may continue from block 505 to block 510.

At block 510, an electric field may be applied to the piezoelectric metal-organic framework material. Processing may continue from block 510 to block 515.

At block 515, a gas may be stored in the piezoelectric metal-organic framework material. Any gas as discussed above may be stored in any manner as discussed. For example, a gas may be provided by opening a valve and providing the gas into a vessel having the piezoelectric metal-organic framework material. In some examples, the piezoelectric metal-organic framework material may selectively adsorb a gas based at least in part on the magnitude of the applied electric field such that one type of gas is adsorbed at one field strength and another type of gas is adsorbed at another field strength. In such examples, the applied electric field may have to be substantially tuned at based at least in part on the type of gas to be stored. Processing may continue from block 515 to block 520.

At block 520, at least a portion of the applied electric field may be removed in any manner as discussed above. The removal of the electric field or a portion of the electric field may release at least a portion of the gas and may pressurize a vessel, a valve or the like. Processing may continue from block 520 to block 525.

At block 525, the valve may be opened to release the gas. As shown, in an example, the electric field may be released or removed prior to the valve opening such that the gas may be pressurized or pre-pressurized. In some examples, the valve may be opened and the electric field may be removed or reduced substantially simultaneously. In other examples, the valve may be opened prior to removing or reducing the electric field. Processing may continue from block 525 to block 530.

At block 530, method 500 may determine whether the gas supply or release is complete. In some examples, the determination may be made based on feedback, for example, from the system or unit receiving the gas. In other examples, the determination may be based without feedback and it may be made on, for example, an elapsed amount of time or a predetermined pressure drop or the like. In any event, if the supply of gas is not complete, the valve may remain open and the electric field application may continue, and the method may continuously or periodically return to decision block 530. Processing may remain in block 530 until the gas supply is complete. When the supply of gas is complete, then processing may continue from block 530 to block 535.

At block 535, the valve (if used) may be closed. Processing may continue from block 535 to block 540.

At block 540, an electric field may be applied or reapplied to store the gas. Upon application or reapplication of the electric field, at least a portion any remaining gas may be adsorbed into the piezoelectric metal-organic framework material. Processing may continue from block 540 to block 545.

At block 545, method 500 may determine whether additional gas is to be supplied. In some examples, the determination may be based on feedback from another system or unit. In other examples, the determination may be based on a predetermined parameter, such as a volume of gas to be released, counter value that stores the number of times gas has been released or the like. If additional gas is to be supplied or released, the method may proceed from block 545 to block 520. If no additional gas is to be released, then processing may continued from block 545 to block 550.

At decision block 550, method 500 may determine whether additional gas is to be stored (for example, to recharge the system for additional gas release). If additional gas is to be stored, then the method may proceed from block 550 to block 510 and the method or portions of the method may be repeated. If additional gas is not to be stored, then the method may proceed from block 550 to block 555, where the process may terminate.

Although the discussion herein has focused on techniques related to the storage and release of a gas, the techniques discussed may be extended to gas purification and separation. For example, a device as discussed above may be exposed to a gas mixture. The piezoelectric metal-organic framework materials discussed may selectively remove a gas (or gases) from the mixture such that a separation or purification may be achieved. The selective removal of gas may be performed in any manner as discussed above. The gas removed from the mixture into the piezoelectric metal-organic framework material may be subsequently released.

Claimed subject matter is not limited in scope to the particular implementations described herein. Reference in the specification to "an implementation," "one implementation," "some implementations," "other implementations," "an example," "some examples," "various examples," or "other examples" may mean that a particular feature, structure, or characteristic described in connection with one or more implementations or examples may be included in at least some implementations or examples, but not necessarily in all implementations or examples. The various appearances of "an implementation," "one implementation," "some implementations," "an example," "some examples," "various examples," or "other examples" in the preceding description are not necessarily all referring to the same implementations or examples.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method for storing and releasing a gas, the method comprising:
   providing a piezoelectric metal-organic framework material;

adsorbing at least a portion of the gas into the piezoelectric metal-organic framework material; and applying an electric field to the piezoelectric metal-organic framework material to release a portion of the gas.

2. The method of claim 1, wherein the piezoelectric metal-organic framework material comprises one or more of MOF-177, MOF-74, an MOF-74 framework structure with open Zn2+ sites, a 2D laminar homochiral metal-organic framework, and/or a piezoelectric metal-organic framework material having the chemical formula (Lig)2Tb(H2O)2(ClO4), wherein Lig corresponds to a ligand comprising one or more of oxalic acid, malonic acid, succinic acid, glutaric acid, phthalic acid, isophthalic acid, terephthalic acid, citric acid, trimesic acid, 1,2,3-triazole, pyrrodiazole and/or squaric acid.

3. The method of claim 1, wherein the gas comprises one or more of hydrogen, carbon dioxide, ammonia, boron trifluoride, and/or aluminum trifluoride.

4. The method of claim 1, further comprising varying a magnitude of the applied electric field to vary an amount of gas released from the piezoelectric metal-organic framework material.

5. A method for storing and releasing a gas comprising:
providing a piezoelectric metal-organic framework material;
applying an electric field to the piezoelectric metal-organic framework material;
adsorbing at least a portion of the gas into the metal-organic framework material during application of the electric field; and
reducing an electric field strength of the electric field to release at least a portion of the gas.

6. The method of claim 5, wherein the piezoelectric metal-organic framework material comprises one or more of MOF-177, MOF-74, an MOF-74 framework structure with open Zn2+ sites, a 2D laminar homochiral metal-organic framework, and/or a piezoelectric metal-organic framework material having the chemical formula (Lig)2Tb(H2O)2(ClO4), wherein Lig corresponds to a ligand comprising one or more of oxalic acid, malonic acid, succinic acid, glutaric acid, phthalic acid, isophthalic acid, terephthalic acid, citric acid, trimesic acid, 1,2,3-triazole, pyrrodiazole and/or squaric acid.

7. The method of claim 5, wherein the gas comprises one or more of hydrogen, carbon dioxide, ammonia, boron trifluoride, and/or aluminum trifluoride.

8. The method of claim 5, further comprising:
applying a second electric field to the piezoelectric metal-organic framework material, wherein the second electric field has a different magnitude than the first electric field; and
adsorbing at least a portion of a second gas into the piezoelectric metal-organic framework material during application of the second electric field, wherein the second gas is different than the gas.

9. An apparatus that is arranged to store a gas and release the gas responsive to the application of an electric field, the apparatus comprising:
a piezoelectric metal-organic framework material, the piezoelectric metal-organic framework material configured to adsorb at least a portion of the gas in response to the application of an electric field;
a power supply;
a controller coupled to the power supply, wherein the controller is arranged to control the application of the electric field with the power supply;
a vessel, wherein the piezoelectric metal-organic framework material is in the vessel; and
a gas port in the vessel, wherein the gas port is arranged to convey the gas when gas is either released or stored by the apparatus.

10. The apparatus of claim 9, wherein the piezoelectric metal-organic framework material comprises a non-centrosymmetric piezoelectric metal-organic framework material.

11. The apparatus of claim 9, wherein the piezoelectric metal-organic framework material comprises one or more of MOF-177, MOF-74, and/or an MOF-74 framework structure with open Zn2+ sites.

12. The apparatus of claim 9, wherein the piezoelectric metal-organic framework material comprises a 2D laminar homochiral metal-organic framework.

13. The apparatus of claim 9, wherein the piezoelectric metal-organic framework material comprises a piezoelectric metal-organic framework material having the chemical formula (Lig)2Tb(H2O)2(ClO4), wherein Lig corresponds to a ligand comprising one or more of oxalic acid, malonic acid, succinic acid, glutaric acid, phthalic acid, isophthalic acid, terephthalic acid, citric acid, trimesic acid, 1,2,3-triazole, pyrrodiazole and/or squaric acid.

14. The apparatus of claim 9, further comprising:
a second piezoelectric metal-organic framework material.

15. A method of storing and releasing a gas responsive to the application of an electric field, the method comprising:
providing a piezoelectric metal-organic framework material, the piezoelectric metal-organic framework material configured to adsorb at least a portion of the gas in response to the application of an electric field;
adsorbing at least a portion of the gas into the piezoelectric metal-organic framework material; and
applying an electric field to the piezoelectric metal-organic framework material to release a portion of the gas.

* * * * *

UNITED STATES PATENT AND TRADEMARK OFFICE
CERTIFICATE OF CORRECTION

| | | |
|---|---|---|
| PATENT NO. | : 8,568,511 B2 | Page 1 of 1 |
| APPLICATION NO. | : 13/493841 | |
| DATED | : October 29, 2013 | |
| INVENTOR(S) | : Miller | |

It is certified that error appears in the above-identified patent and that said Letters Patent is hereby corrected as shown below:

In the Specification

In Column 6, Lines 55-56, after "share electrodes.", insert -- As illustrated, a gas storage and release device 200 may include piezoelectric metal-organic framework materials 210, 212, 214, and 216, which may be electrically coupled to one or more of electrodes 220, 222, 224, 226, and/or 228. The electrodes may be coupled to a power supply (not shown) by one or more connectors 230, 232, 234, 236, and/or 238. Although several piezoelectric metal-organic framework materials and electrodes are shown in FIG. 2, any number may be used, such as for example, from about two (2) to hundreds of piezoelectric metal-organic framework materials (along with the appropriate number of electrodes). In various examples, about two (2) to about ten (10) piezoelectric metal-organic framework materials and appropriate numbers of electrodes may be provided. In other examples, about ten (10) to about five-hundred (500) piezoelectric metal-organic framework materials and appropriate numbers of electrodes may be provided. --.

Signed and Sealed this
Eighth Day of April, 2014

Michelle K. Lee
*Deputy Director of the United States Patent and Trademark Office*